(12) United States Patent
Cherdron et al.

(10) Patent No.: US 8,713,445 B2
(45) Date of Patent: Apr. 29, 2014

(54) SYSTEMS AND METHODS FOR GENERATING CUSTOMIZED USER INTERFACES

(75) Inventors: Markus Cherdron, Mülhausen (DE); Ivan Perelomov, Heidelberg (DE)

(73) Assignee: SAP AG, Walldorf (DE)

( * ) Notice: Subject to any disclaimer, the term of this patent is extended or adjusted under 35 U.S.C. 154(b) by 517 days.

(21) Appl. No.: 12/945,394

(22) Filed: Nov. 12, 2010

(65) Prior Publication Data

US 2012/0124480 A1    May 17, 2012

(51) Int. Cl.
*G06F 3/00* (2006.01)

(52) U.S. Cl.
USPC ............... 715/744; 725/68; 715/762; 705/37; 705/9

(58) Field of Classification Search
None
See application file for complete search history.

(56) References Cited

U.S. PATENT DOCUMENTS

| | | | |
|---|---|---|---|
| 2002/0178103 A1* | 11/2002 | Dan et al. | 705/37 |
| 2005/0198678 A1* | 9/2005 | Mise et al. | 725/88 |
| 2007/0271523 A1* | 11/2007 | Lacey et al. | 715/762 |
| 2009/0182606 A1* | 7/2009 | Chug et al. | 705/9 |

* cited by examiner

*Primary Examiner* — Boris Pesin
*Assistant Examiner* — Ayesha Huertas Torres
(74) *Attorney, Agent, or Firm* — Finnegan, Henderson, Farabow, Garrett & Dunner, LLP

(57) ABSTRACT

Systems and methods consistent with the invention may include receiving, over an electronic network, a contract description message including description information corresponding to a computer device being used to display the contract to a user, retrieving, by using a processor, the description information from the contract description message, comparing the description information with information stored in a template library and adaptor library to identify a generic user interface and a corresponding adaptor module, and generating a contract response message based on a result of the comparison, the response message including an instruction to generate, on the computer device, a customized user interface based on the identified generic user interface and corresponding adaptor module when the generic user interface and the corresponding adaptor module are identified.

20 Claims, 4 Drawing Sheets

SYSTEMS AND METHODS FOR GENERATING CUSTOMIZED USER INTERFACES

BACKGROUND

1. Relevant Field

Systems and methods consistent with the present invention generally relate to generating customized user interfaces. More particularly, systems and methods consistent with the invention relate to generating customized user interfaces relating to contracts.

2. Background Information

Businesses and other organizations are involved in various transactions during the course of their operation. Most transactions are based on agreements between multiple parties and may require presenting of the written agreements to the parties involved in the transaction. The written agreements (broadly referred to hereinafter as "contracts") may include purchase orders, employment contracts, rental agreements, marketing agreements, service contracts, sales contracts, estate agreements, and/or any similar agreement being entered by two or more individuals and/or organizations.

As operations of an organization increase and become more complex, the contracts used during operations of the organization also increase in number and complexity. Further, negotiating contractual terms and executing the contract may require presenting a contract to parties in different locations. To facilitate the process of presenting a contract and/or negotiating contractual terms with multiple parties, a user interface and/or a screen corresponding to the contract may be generated and provided for access by computer systems of multiple parties. Such a process may require the use of different types of data object, screen elements, and/or other similar items to program a user interface displaying arious terms of the contract. After generation, the user interface may be provided to the parties so that they can view and/or negotiate the terms of the contract.

The parties involved in a transaction based on the contract may have computer systems that may require different protocols and or plug-ins in order to properly view the user interface generated based on the contract. Thus, one or more contracting party may not be able to view the user interface properly and may request generation of a new user interface based on specifications of their computer system. This may result in delaying negotiation and/or execution of the contract and re-programming the user interface may increase resource costs of the parties involved in the transaction.

Further, each time a contractual party suggests a change in the contractual terms, multiple sets of new user interfaces may need to be generated to account for differing computing systems of the parties. This may again delay execution of the contract and may increase resource costs.

In view of the foregoing, it is desirable to provide simplified methods and systems that generate customized user interfaces for a computer-implemented system used to manage contracts of an organization.

SUMMARY

In accordance with one embodiment of the invention, a computer-implemented method of generating a customized user interface representing a contract is provided. The method includes receiving, over an electronic network, a contract description message including description information corresponding to a computer device being used to display the contract to a user; retrieving, by using a processor, the description information from the contract description message; comparing the description information with information stored in a template library and adaptor library to identify a generic user interface and a corresponding adaptor module; and generating a contract response message based on a result of the comparison, the response message including an instruction to generate, on the computer device, a customized user interface based on the identified generic user interface and corresponding adaptor module when the generic user interface and the corresponding adaptor module are identified.

Consistent with another embodiment of the present invention, there is provided a system for generating a customized user interface representing a contract. The system includes a memory device storing a template library, an adaptor library, and instructions; a data processor executing the instructions to receive, over an electronic network, a contract description message including description information corresponding to a computer device being used to display the contract to a user; and retrieve the description information from the contract description message; and a comparator comparing the description information with information stored in the template library and the adaptor library to identify a generic user interface and a corresponding adaptor module, wherein the data processor generates a contract response message based on a result of the comparison, the response message including an instruction to generate, on the computer device, a customized user interface based on the identified generic user interface and corresponding adaptor module when the generic user interface and the corresponding adaptor module are identified.

In accordance with another embodiment of the present invention, there is provided a computer-readable storage medium including instructions which, when executed on a processor, cause the processor to perform a method of generating a customized user interface representing a contract. The method includes receiving a contract description message including description information corresponding to a computer device being used to display the contract; retrieving the description information from the contract description message; comparing the description information with information stored in a template library and adaptor library to identify a generic user interface and a corresponding adaptor module; and generating a contract response message based on a result of the comparison, the response message including an instruction to generate, on the computer device, a customized user interface based on the identified generic user interface and corresponding adaptor module when the generic user interface and the corresponding adaptor module are identified.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
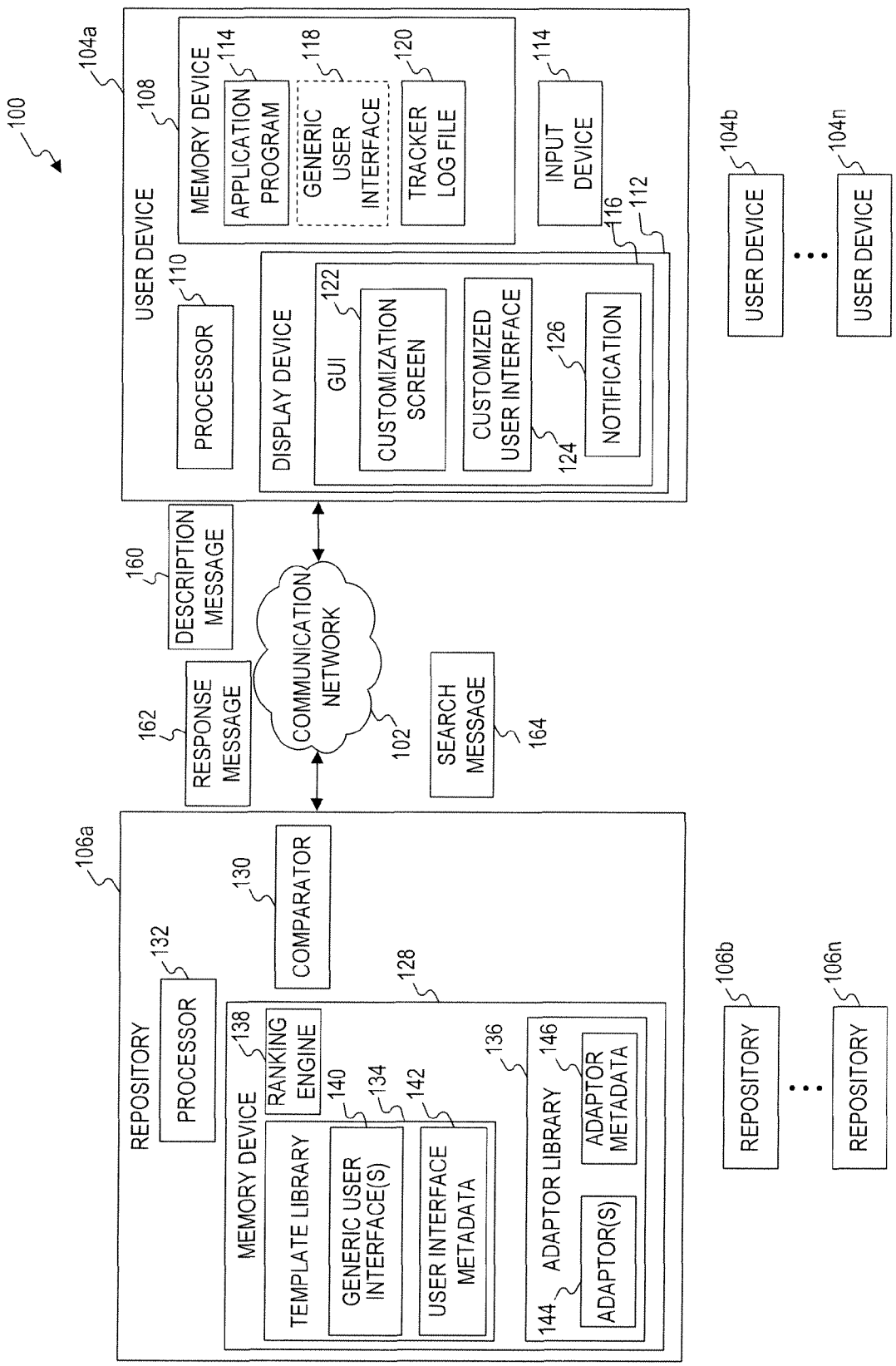
FIG. 1 illustrates an exemplary system for generating a customized user interface, consistent with the present invention

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention generally relate to customization of user interfaces of a computer system facilitating transactions based on contracts. Exemplary systems consistent with the invention include those offered by SAP AG, such as SAP NetWeaver® Composition Environment and SAP NetWeaver® Business Process Management (SAP NetWeaver BPM). SAP NetWeaver BPM may integrate information and business processes across technologies and organizations, and may model, execute, and monitor business processes based on a common process model.

FIG. 1 illustrates an exemplary user interface generation system 100 consistent with the invention. As shown in FIG. 1, system 100 includes a communication network 102 that facilitates communication between a plurality of nodes 104a-n and 106a-n. Communication network 102 may include one or more network types, such as a wide-area network (WAN), a local-area network (LAN), or the Internet. Communication network 102 may operate by wireline and/or wireless techniques and may use transmission control protocol/internet protocol ("TCP/IP") or any other appropriate protocol to facilitate communication between nodes 104a-n and 106a-n of system 100. Network connections between the nodes of system 100 may be established via Ethernet, telephone line, cellular channels, or other transmission media.

Each node of system 100 may comprise a combination of one or more application programs and one or more hardware components. For example, application programs may include software modules, sequences of instructions, routines, data structures, display interfaces, and other types of structures that execute operations of the present invention. Further, hardware components may include a combination of Central Processing Units (CPUs), buses, memory devices, storage units, data processors, input devices, output devices, network interface devices and other types of components that will become apparent to those skilled in the art.

Consistent with an embodiment of the present invention, nodes 104a-n may be user devices 104a-n and nodes 106a-n may be repositories 106a-n. User device 104a may be an appropriate device for sending, receiving, and presenting data. For example, user device 104a may include a personal computer, a point-of-sale terminal, a workstation, mainframe computer, notebook, or a handheld device such as a cellular phone and a personal digital assistant.

As illustrated in FIG. 1, user device 104a may include a memory device 108, a processor 110, a display device 112, and an input device 114. Memory device 108 may be used to store instructions, such as an application program 114 which may be executed by processor 110 to cause user device 104a to implement a plurality of operations. For example, application program 114 may be executed on processor 110 to display a graphical user interface (GUI) 116 on display device 112. Memory device 108 may also store a generic user interface 118 and a tracker log file 120.

Input device 114 may be a keyboard, a mouse, a trackerball, a stylus, a voice recognition device, and/or a touch screen implemented in GUI 116. Processor 110 may also function as a compiler and may execute source code of application program 114 to generate executable code and/or compiled code. Input device 114 and GUI 116 may allow a user of user device 104a to interface with at least a portion of system 100. For example, GUI 116 may display a customization screen 122 that may include options for selection by user to generate a customized user interface 124 corresponding to a contract. GUI 116 may also display a notification to inform a user of user device 104a about any errors and/or to receive additional information from the user. User device 104a may also include additional components, and user devices 104b-n may also include memory devices, processors, and application programs as described above with respect to user device 104a.

User devices 104a-n may communicate with repositories 106a-n via communication network 102. The communication may include sending data, such as requests to provide a generic user interface and/or receiving instructions for generation of a customized user interface when generic user interface 118 may not be available or may be corrupted. Repository 106a may include a memory device 128, a comparator 130, and a processor 132. Memory device 128 may include a template library 134, an adaptor library 136, a ranking engine 138, and other application programs (not shown). Template library 134 may store one or more generic user interface(s) 140 that may correspond to various types of contracts. Generic user interface(s) 140 may include various types of templates, shell screens, and/or instructions or components to generate the templates and shell screens.

Generic user interface(s) 140 may be defined and generated based on coordination of multiple parties and may be stored in a universal and/or technology-independent protocol such that a shell screen generated based on generic user interface(s) 140 may be compatible with computing systems running on different platforms. For example, generic user interface(s) 140 may include instructions to generate a screen based on standards set by a standard-setting committee. The standard-setting committee may, for example, require all vendors of a particular type of software to use a specific contract when placing a supply order for the software product. The requirements set by the standard-setting committee may be used to store instructions that may display the contract as one of generic user interface(s) 140. In order to facilitate access to generic user interface(s) 140, user interface metadata 142 may be stored in template library 134 that may describe characteristics, functions, and/or features of the generic user interfaces. User interface metadata 142 may be used by comparator 130 to search for a particular type of universal and/or technology-independent generic user interface 140.

Adaptor library 136 may include various types of adaptor(s) 144 and adaptor metadata 146 that may describe characteristics, functions, and/or features of the adaptors. Adaptor(s) 144 may be modules that may be used to convert a technology-independent generic user interface, retrieved from template library 134, to a customized user interface that may be specific for a particular technology and/or user. For example, template library 134 may store instructions to generate a generic user interface having data objects with minimal graphics and/or images and user device 104a may request generation of customized user interface 124 having an increased number of graphics. In such a case, an adaptor module may be provided with a generic user interface to user device 104a and the adaptor module may be used to customize the generic user interface based on the user's instructions.

Adaptor(s) 144 may also be automatically provided, independent of any request from a user, based on determination of a type of computing platform that requests a generic user interface. Further, processor 132 may use an adaptor and generic user interface to generate and provide a customized screen to user device 104a such that user device 104a may display customized user interface 124 without the need to process an adaptor and generic user interface.

Adaptor(s) 144 may also be used to unlock restricted or disabled fields of customized user interface 124. For example, customized user interface 124 may only allow a user to edit certain fields due to an authorization level of the user and/or the price paid by the user. A user may request an additional adaptor to enable additional features of customized user interface 124. This may be based on purchase of an additional adaptor and/or a change in the authorization level of the user.

Repository 106a may use comparator 130 and/or processor 132 to retrieve a suitable generic user interface and adaptor from template library 134 and adaptor library 136, respectively, when a description message 150 may be received from user device 104a. Comparator 130 may compare descriptive information included in description message 150 with user interface metadata 142 and adaptor metadata 146 to search for a suitable and/or requested generic user interface and adaptor. Ranking engine 148 may be executed using processor 132 to rank generic user interface(s) 140 and/or adaptor(s) 144 when comparator 130 determines that more than one suitable generic user interface and/or adaptor matches the criteria included in description message 150.

Although the exemplary embodiment of system 100 is illustrated as having particular components arranged in a particular manner, one skilled in the art will appreciate that system 100 may include additional or fewer components that may be arranged differently. For example, user devices 104a-n and repositories 106a-n may include additional processors and/or memory devices. System 100 may be implemented as a standalone station such that instructions to implement comparator 130, template library 134, adaptor library 136, and ranking engine 148 may be included in a single user device 104a. System 100 may be implemented with a single generic user interface and/or may be implemented without comparator 130, ranking engine 148, or template library 134. System 100 may include additional user devices and/or repositories, and may be implemented in a client/server arrangement. Instructions corresponding to ranking engine 148 may be included in application program 114 and may be implemented as a single program. Comparator 130 may be implemented as a separate hardware component or may be implemented as instructions stored in memory device 128. Similarly, ranking engine 148 may be implemented as a separate hardware component. Memory devices 108 and 128 may include all forms computer-readable storage mediums such as of non-volatile or volatile memory, including, by way of example, non-transitory semiconductor memory devices, such as EPROM, RAM, ROM, DRAM, EEPROM, and flash memory devices; magnetic disks such as internal hard disks and removable disks; magneto-optical disks; and CD-ROM disks.

Consistent with an embodiment of the invention, a user of user device 104a may require display of customized user interface 124 on GUI 116. For example, when processor 110 executes application program 114 to complete a transaction based on a contract, the user may request display of the contract as a customized user interface 124 so that the user may negotiate and/or execute the contract. Processor 110 may determine whether generic user interface 118 is stored in memory device 108 and may display a customization screen 122 on GUI 116 to provide options to the user for generating customized user interface 124 based on generic user interface 118. For example, customization screen 122 may include options such as enabling and/or disabling certain fields of customized user interface 124, changing dates representing the duration of the contract, removing and/or adding fields displaying certain clauses of a contract, removing and/or adding graphics, and/or any other option that may be apparent to one of skill in the art. The user of user device 104a may select a customization option by using input device 114. Customization screen 122 may be displayed automatically before and/or after display of customized user interface 124. Further, customization screen 122 may be displayed in response to input by a user.

After accepting the user's options, customization screen 122 may be displayed on GUI 116 when user device 104a may be determined to have the capability to convert and/or modify generic user interface 118 based on the options. Alternatively, user device 104a may generate and send a description message 160 to repository 106a to retrieve a suitable adaptor for customization of generic user interface 118. As will be explained in detail below, repository 106a may retrieve description information from description message 160 and provide one or more suitable adaptors from adaptor library 136 based on a comparison by comparator 130 between description information and adaptor metadata 146. User device 104a may use the provided adaptor to generate customized user interface 124 and may display a notification 126 to request feedback from the user regarding, for example, the accuracy of the customizations. A record of the customized user interface 124 and/or the user feedback may be stored in tracker log file 120.

User device 104a may generate a description message 160 when generic user interface 118 may be unavailable. Generic user interface 118 may be unavailable when it may not be stored in memory device 108, when generic user interface 118 may be corrupt, and/or when generic user interface 118 may be determined to be an outdated version. Description message 160 may be generated automatically and/or may be generated after notification 126 may be displayed on user device 104a. Notification 126 may inform the user that generic user interface 118 is unavailable and may inform the user that user device 104a may have to connect to communication network 102 to retrieve a generic user interface and/or appropriate adaptors. Notification 126 may also include an option for the user to approve and/or disapprove connecting to communication network to retrieve a generic user interface and/or adaptors.

User device 104a may also generate customization screen 122 including customization options. The customization options may allow the user to provide information regarding an adaptor that may be needed to modify fields of a generic user interface. For example, a user may have a knowledge from a prior transaction that a particular contract may be displayed based on a particular generic user interface and may need certain modifications and/or adaptors for a current transaction. Customization screen 122 may be displayed before generation of description message 160 and/or may be displayed after display of customized user interface 124 to enable the user to modify the customized user interface after the user may have had the opportunity to view it.

Description message 160 may include description information describing hardware requirements of user device 104a, software requirements of user device 104a, the type of transaction and/or contract currently being implemented by the user, and/or any customization options that a user may have chosen in response to display of customization screen 122. Description message 160 may be encrypted before being sent to repository 106a via communication network 102. Upon receipt of description message 160, processor 132 may decrypt description message 160 and may retrieve description information included in description message 160.

Comparator 130 may use description information retrieved from description message 160 to determine suitable matches from template library 134 and/or adaptor library 136. For example, comparator 130 may compare description information describing the type of contract and/or transaction that the user of user device 104a may be implementing and may compare it with user interface metadata 142 to determine suitable generic user interface(s) 140. When a suitable generic user interface may be found and/or instructions to generate a suitable generic user interface may be found in template library 134, repository 106a may send a response message 162 to user device 104a for implementation of customized user interface 124 based on the matching generic user interface.

Comparator 130 may determine that a plurality of generic user interface(s) 140 match the description information included in description message 160. Ranking engine 148 may use search and retrieval techniques known to those skilled in the art, such as the NetWeaver Text Retrieval and Extraction (TREX) search engine offered by SAP AG, and comparison results provided by comparator 130 to rank the corresponding generic user interface(s) 140. Repository 106a may include instructions corresponding to the highest ranked generic user interface in response message 162 and/or may include a list of matching generic user interfaces with their corresponding ranks in response message 162 to be sent to user device 104a. User device 104a may implement customized user interface 124 based on the highest ranked generic user interface and/or may display a notification 126 with the list of matching generic user interfaces to provide the user with the option of selecting a generic user interface from the list.

Comparator 130 may also determine that no suitable matches may be available in template library 134 and may include a request for additional description information in response message 162. The request may be displayed as notification 126 and may provide the user with an option to provide additional description information for generation of a new description message. Further, repository 106a may generate a search message 164 and may send it to repositories 106b and/or additional components (not shown) to request for a new generic user interface. Repository 106a may also generate a new generic user interface based on data stored in memory device 128 when comparator 130 determines that no suitable generic user interfaces may be available.

Comparator 130 may also use additional description information included in description message 160 to determine whether a suitable adaptor may be available in adaptor library 136. For example, comparator 130 may compare description information describing the requirements of user device 104a and/or customization options selected by the user with adaptor metadata 146 to determine whether one suitable adaptor, a plurality of suitable adaptors, and/or no suitable adaptors may be available. The remaining functions of comparator 130 and ranking engine with respect to search, retrieval, and providing of adaptors may be similar to the functions performed with respect to the search, retrieval, and providing of a suitable generic user interface(s) 140. For example, a suitable adaptor, a list describing suitable adaptors and their corresponding ranks, a top-ranked suitable adaptor, or a message explaining that no suitable adaptors may be included in response message 162 to be sent to user device 104a. A search message 164 may also be generated to request for a new adaptor and/or a new adaptor may be generated by repository 106a.

Based on the settings of repository 106a and user device 104a, repository 106a may include a suitable generic user interface and a corresponding suitable adaptor, instructions for generation of a suitable generic user interface and a corresponding suitable adaptor, and/or instructions corresponding to a generated customized user interface 124 in response message 162. For example, based on description information included in description message 160, repository 106a may determine that user device 104a may or may not have processing ability to generate customized user interface 124 if only instructions for generation of a suitable generic user interface and a corresponding suitable adaptor may be included in response message 162. Thus, to minimize the load on communication network 102 and/or user device 104a, and/or to minimize the processing steps performed by repository 106a, the content of response message 162 may be controlled based on specifications and processing capacity of user device 104a. Repository 106a may also include profile information corresponding to user devices 104a-n, and may use the profile information to determine the content that needs to be included in response message 162 for generation of customized user interface 124.

User device 104a may retrieve content included in response message 162 and may process the content to display customized user interface 124. Depending on the content included in response message 162, user device 104a may generate customized user interface 124 by converting a technology-independent generic user interface into a technology dependent customized user interface based on adaptors included in the content. In the alternative, the content may include instructions corresponding to a converted customized user interface, and user device 104a may simply retrieve the content and display it as customized user interface 124 without performing extensive processing of the retrieved content.

Customization screen 122 may also be displayed on GUI 116, after display of customized user interface 124, to provide options to the user to modify the customized user interface 124. For example, a user may determine that certain fields on customized user interface 124 may need to be enabled, changed, and/or added to negotiate and/or execute a contract displayed by the customized user interface. The user may select options displayed in customization screen 122 and, if possible, user device 104a may adjust customized user interface 124 based on the displayed options. User device 104a may determine that it may not be possible to adjust the customized user interface 124 without additional adaptors and may provide a notification 126 informing the user that additional adaptors may need to be purchased and/or retrieved. Alternatively, user device may automatically generate a new description message to retrieve additional adaptors from repository 106a. System 100 may also be used to order adaptor(s) 144 from repository 106a when generic user interface 118 may be stored in memory device 108. Similarly, a corrupted or outdated generic user interface 118 may be corrected or updated based on adaptor(s) 144 received from repository 106a.

A notification 126 may be displayed on GUI 116 after generation of customization screen 122. Notification 126 may prompt the user to input feedback regarding customized user interface 124, the ranking of generic user interface(s) 140 and adaptor(s) 144, and/or the generic user interface and adaptor selected by comparator 130. Based on the feedback a record of the transaction may be stored in tracker log file 120 and may be used in subsequent operations that may require the use of a similar customized user interface 124. For example, a user may need to perform a transaction with an additional client based on a similar contract and generation of a new customized user interface may be performed by using information stored in tracker log file 120 regarding previous transactions.

An exemplary implementation of system 100 may include, for example, displaying of a retail agreement at a point of purchase. For example, user device 104a may represent a point-of-sale terminal that may be placed in a retail store. In such an implementation, user device 104a may display GUI 116 that may provide a customer and/or a store employee to purchase a particular product. Upon receiving a selection of a particular product, user device 104a may determine that the sale of the product requires agreement to the terms of a particular contract and may send description 160 to retrieve suitable generic user interface(s) 140 and/or adaptor(s) 144. Upon receiving description message 160, repository 106a may perform functions as described above and may generate a response message 162 including instructions corresponding to a generic user interface and/or an adaptor module.

User device 104a may process response message 162 and may display customized screen 122 based on the received instructions. The customized screen 122 may display a contract that may need to be executed by the customer before purchase of the particular product may be completed. The customer may be able to add certain options to the product being purchased by negotiating terms of the contract and user device 104a may request suitable adaptor modules based on the additional options.

Figure 2:
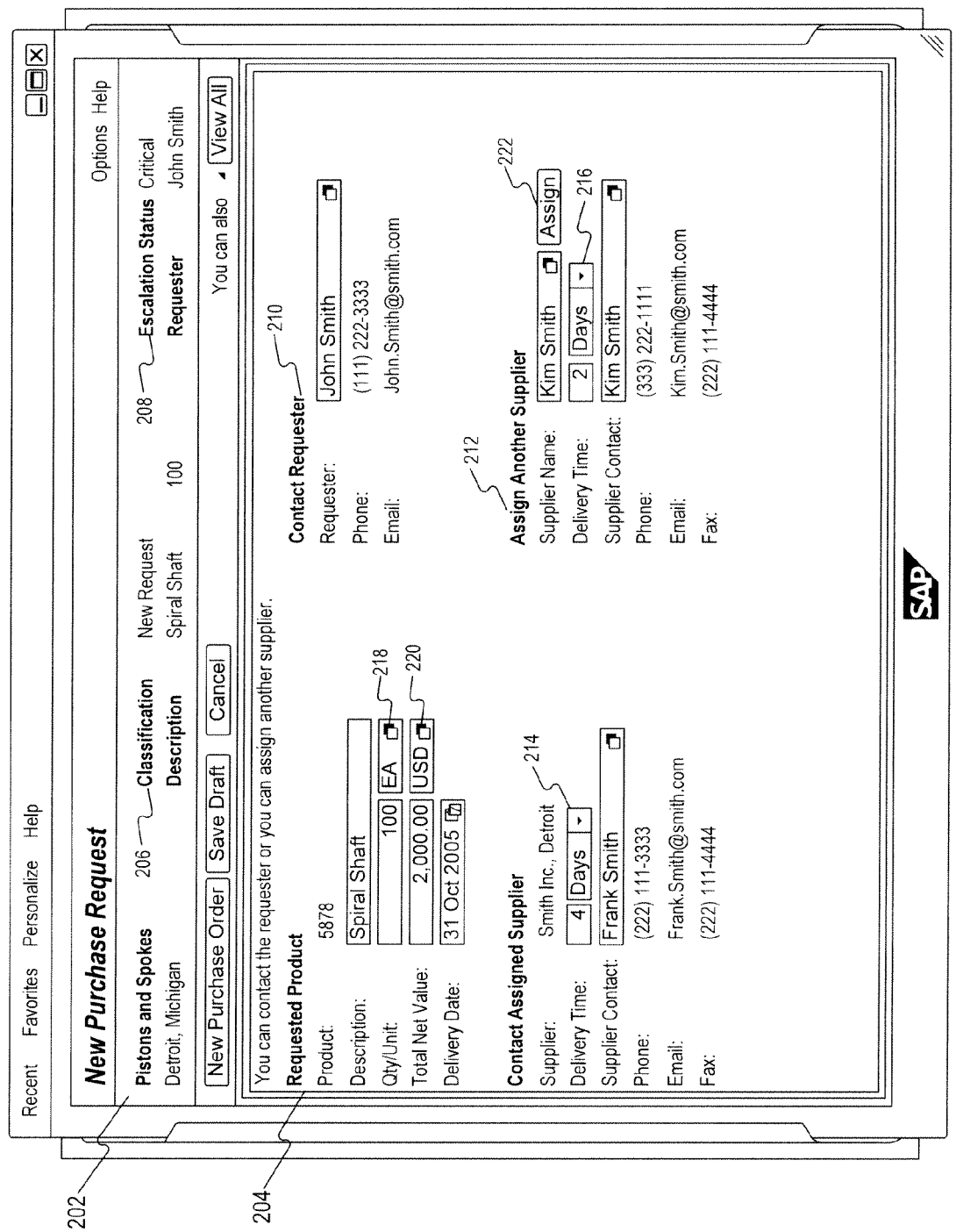
FIG. 2 illustrates a snapshot of an exemplary customized user interface screen corresponding to a contract, consistent with the invention.

FIG. 2 illustrates a purchase request screen 200 rendered during execution of a transaction based on a contract. Purchase request screen 200 may be displayed on, for example, display device 112 of system 100. Purchase request screen 200 may correspond to a contract and may include a header section 202 and a container section 204. Purchase request screen 200 may be rendered when a description message identifying that a user interface corresponding to a purchase request is required for a transaction is received. The description message may also include a customization option.

Header section 202 may include fields 206 and 208 that may be generic to user interfaces generated in response to a request for a purchase request. Container section 204 may include fields 210 and 212 that may be included in response to the customization option included in the description message. For example, a user requesting purchase request screen 200 may indicate that an option to contact him or her be included in the customized user interface. In response to the request, a contact adaptor may be retrieved and field 210 "Contact Requester" may be included before rendering of purchase request screen 200.

As is indicated in FIG. 2, the description message may also indicate that certain fields be formatted in a specific way before rendering of purchase request screen 200. For example, the titles of fields 206, 208, 210, and 212 may be requested to be bolded. Description may also include additional formatting requests such as including drop down menus 214 and 216, including graphics 218 and 220, and/or including a button 222 in the purchase request screen 200. In such a case, a formatting adaptor may be retrieved to customize the purchase request screen 200 based on the request. Additional adaptors may also be used to customize the purchase request screen 200 based on technological limitations of the device used to send the description message and/or of additional devices that may receive the purchase request screen 200. For example, different versions of the purchase request screen 200 may be sent to different users based on the specifications of devices used by the users.

Figure 3:
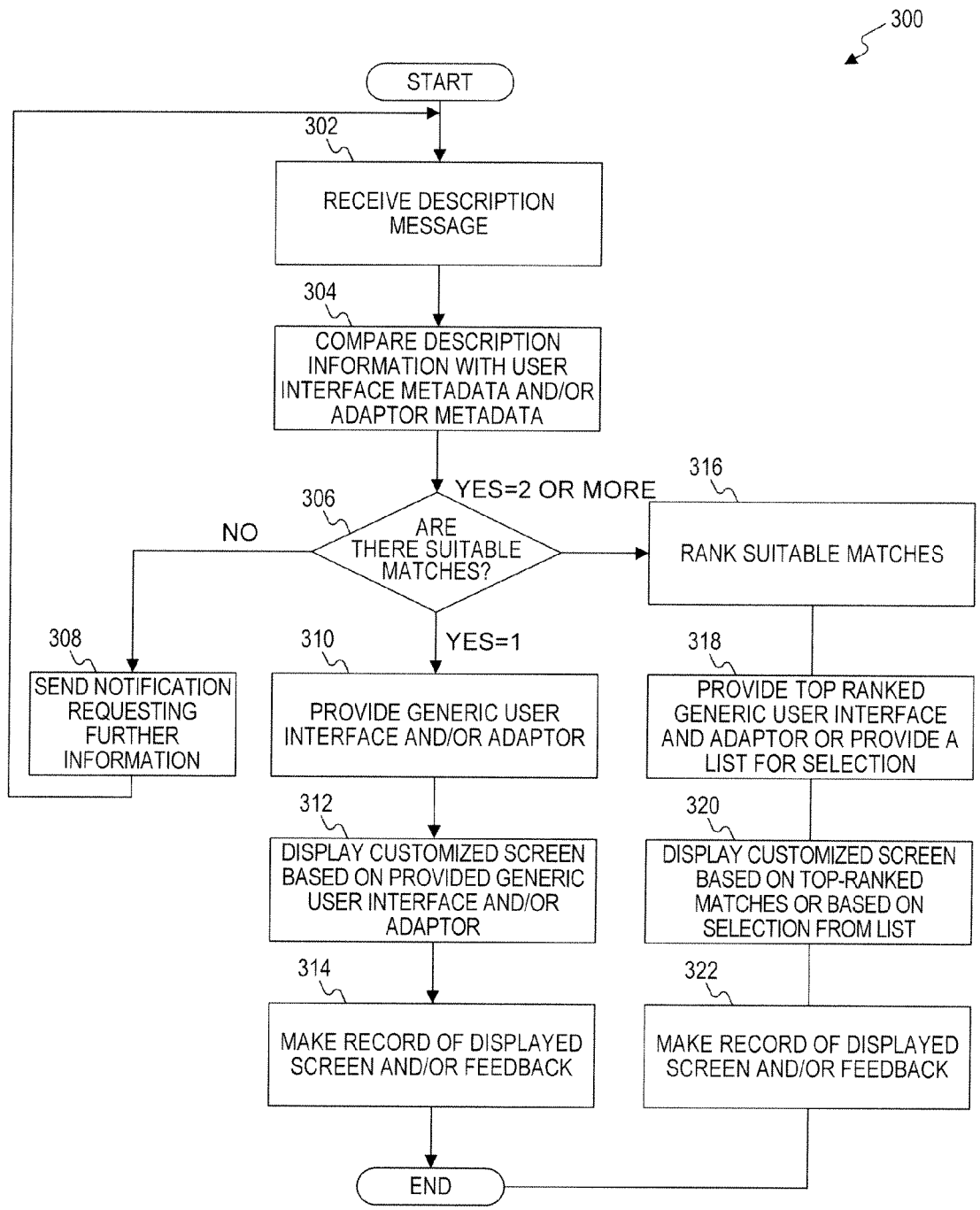
FIG. 3 illustrates a flowchart illustrating an exemplary process for generating a customized user interface, consistent with the present invention.

Referring now to FIG. 3, it illustrates an exemplary flowchart of a process 300 for generating a customized user interface. Process 300 may be implemented using system 100. The process may begin in step 302, where a description message may be received. The description message may be received by, for example, repository 106a and may include description information describing hardware and/or software requirements of a device requesting instructions to generate a customized user interface. The description information may also describe the type of transaction, a contract currently being implemented by the device, and/or any customization options that a user may have requested for customization of a user interface. The description message may include a request for a generic user interface and/or an adaptor.

Next, in step 304, the description information may be compared with user interface metadata and/or adaptor metadata to determine whether suitable matches for generic user interfaces and/or adaptors are available. The comparison may be performed by, for example, comparator 130 of system 100. Next, it may be determined in step 306 whether there are any suitable matches. Depending on the request included in description message the suitable matches may be for a generic user interface, an adaptor, and/or both a generic user and an adaptor. The method may proceed to step 308 when no suitable matches may be available and a notification may be sent to request further information (step 306: No). The notification may prompt a user to provide additional descriptive information and steps 302 to 306 may be repeated.

Alternatively, the method may proceed to step 310 when a single matching generic user interface and/or a single matching adaptor may be available (step 306: Yes=1). In step 310, the generic user interface and/or adaptor instructions representing a customized user interface may be provided to the device that sent the description message. Next, in step 312, a customized screen may be displayed based on the generic user interface and/or adaptor provided in step 310. Next, a record of the displayed customized screen and/or any feedback received from the user may be made (step 314). The record may be made in, for example, tracker log file 120 stored in memory device 108 of system 100.

Alternatively, the method may proceed to step 316 when a plurality of matching generic user interfaces and/or adaptors may be available (step 306: Yes=2 or more). In step 316, the plurality of matches may be ranked based on a relevance to the description information included in description message. The ranking may be performed by, for example, ranking engine 148 of system 100. Next, in step 318, the top ranked generic user interface and/or adaptor or a list of the matches with the ranks may be provided to a user for selection.

Next, a customized screen may be displayed based on the top-ranked matches or a selection received from the user (step 320). Next, in step 322, a record of the displayed customized screen and/or any feedback received from the user may be made (step 322), and the process may end.

Figure 4:
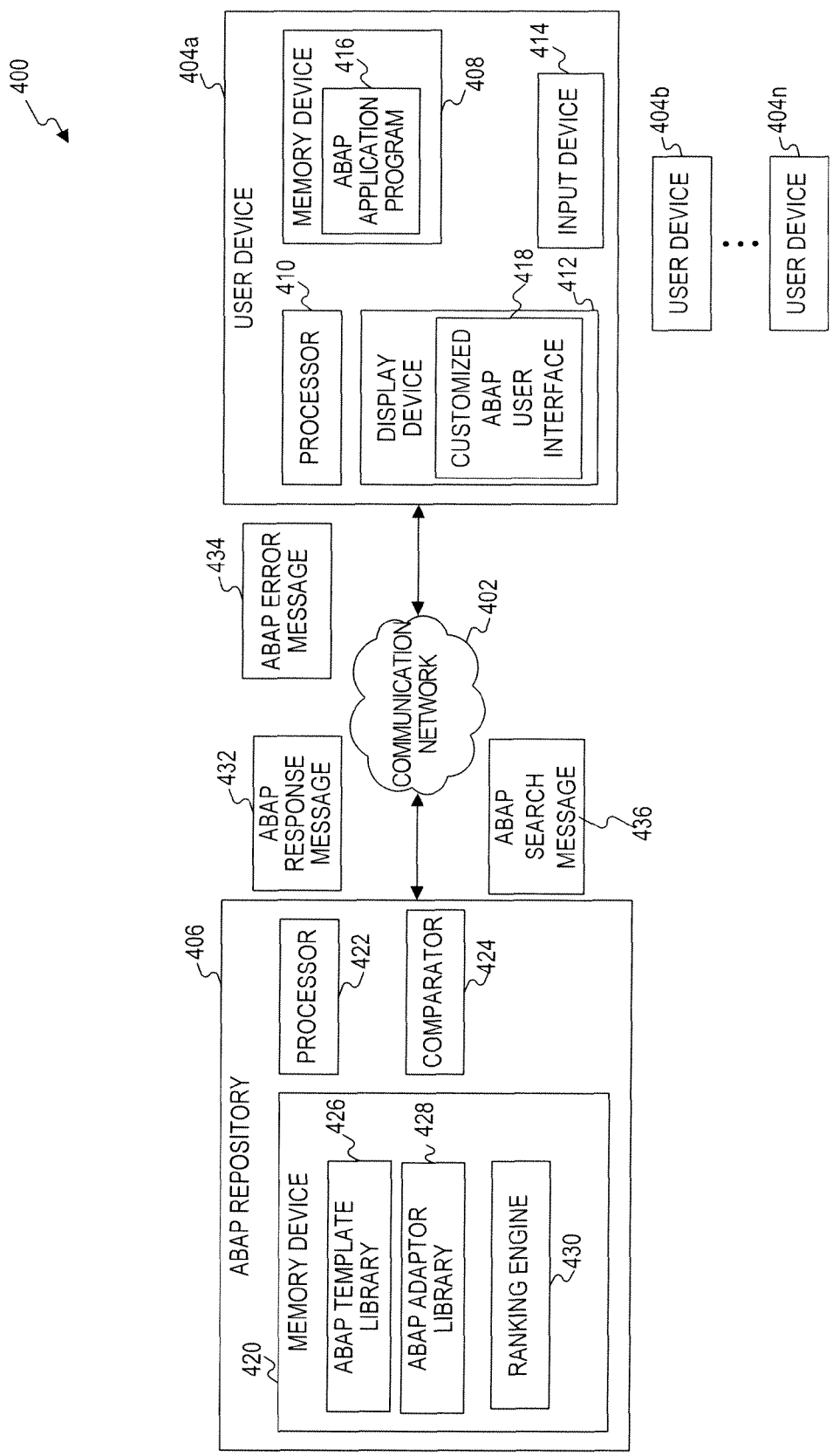
FIG. 4 illustrates an exemplary system for generating a customized user interface based on Advanced Business Application Programming (ABAP) language, consistent with the present invention.

FIG. 4 illustrates an exemplary system for generating a customized ABAP user interface. System 400 may include components similar to the ones disclosed in FIG. 1. For example, system 400 may include a communication network 402 that facilitates communication between user device 404a-n and ABAP repository 406. User device 404a may include a memory device 408, a processor 410, a display device 412, and an input device 414.

Memory device 408 may be used to store instructions, such as an ABAP application program 416, which may be executed by processor 410 to cause user device 404a to implement a plurality of operations such as displaying a customized ABAP user interface 418 on display device 412. ABAP application program 416 may be based on a concept of Logical Databases (LDBs), which facilitate in extraction of data from specific databases. For example, ABAP application program 416 may be customized for specific end-users and may be used to interface with databases specific to a particular organization and/or an end user and processor 410 may be configured to operate as database interface during operation of ABAP application program 416. System 400 may also include an ABAP repository node 406, which may include a memory device 420, a processor 422, and a comparator 424. Memory device 420 may include an ABAP template library 426, an ABAP adaptor library 428, and instructions corresponding to ranking engine 430.

Consistent with an embodiment of the invention, system 400 may operate similar to system 100 and may generate customized ABAP user interface 418 based on content included in ABAP response message 432. For example, as is described in detail above with respect to system 100, user device 404a may generate an ABAP error message 434. ABAP error message 434 may be received by ABAP repository 406 and an ABAP generic user interface and/or an ABAP adaptor may be returned via ABAP response message 432. Customized ABAP user interface 418 may then be displayed on displayed device 412 based on ABAP response message 432. Ranking engine 430 maybe used when more than one matching ABAP generic user interface and/or ABAP adaptor is found, and an ABAP search message 436 may be generated to search for suitable matches in additional components (not shown).

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable storage media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A computer-implemented method of generating a customized user interface representing a contract, comprising:
   receiving, over an electronic network, a contract description message including description information corresponding to a computer device being used to display the contract to a user;
   retrieving, by using a processor, the description information from the contract description message;
   comparing the description information with information stored in a template library and adaptor library to identify a generic user interface and a corresponding adaptor module;
   ranking the identified generic user interface and the identified adaptor module, wherein:
      the identified generic user interface is ranked when the comparison provides a plurality of potential generic user interfaces for generation of the customized user interface; and
      the identified adaptor module is ranked when the comparison provides a plurality of potential adaptor modules for generation of the customized user interface; and
   generating a contract response message based on a result of the comparison and the ranking, the response message including an instruction to generate, on the computer device, the customized user interface based on the identified generic user interface and corresponding adaptor module when the generic user interface and the corresponding adaptor module are identified.

2. The method of claim 1, wherein the description information describes at least one of a hardware requirement of the computer device, a software requirement of the device, and a type of the contract.

3. The method of claim 1, wherein the contract description message is received in response to selection of a customization option by a user of the computer device, the description information describing the customization option.

4. The method of claim 1, wherein the template library includes user interface metadata corresponding to the generic user interface, and comparing the description information with the information includes comparing the user interface metadata with the description information to identify the generic user interface.

5. The method of claim 1, wherein the adaptor library includes adaptor metadata corresponding to the adaptor module, and comparing the description information with the information includes comparing the adaptor metadata with the description information to identify the adaptor.

6. The method of claim 1, wherein the response message includes a notification requesting additional description information from a user when the comparison result does not identify at least one of the generic user interface and adaptor.

7. The method of claim 1, further comprising:
applying the adaptor module to convert the generic user interface into the customized user interface, wherein the customized user interface is compatible with a setting of the device.

8. The method of claim 1, wherein the identified generic user interface is ranked highest from the plurality of potential generic user interfaces.

9. The method of claim 1, further comprising:
including, in the contract response message, a list of the plurality of potential generic user interfaces including the identified generic user interface, wherein the list includes ranks corresponding to the potential generic user interfaces;
sending the contract response message;
receiving a selection of the identified generic user interface based on the contract response message; and
generating, in response to receipt of the selection, an additional contract response message including an instruction to generate the customized user interface.

10. The method of claim 1, wherein the identified adaptor module is ranked highest from the plurality of potential adaptor modules.

11. The method of claim 1, further comprising:
including, in the contract response message, a list of the plurality of potential adaptor modules including the identified adaptor module, wherein the list includes ranks corresponding to the potential adaptor modules;
sending the contract response message;
receiving a selection of the identified adaptor module based on the contract response message; and
generating, in response to receipt of the selection, an additional contract response message including an instruction to generate the customized user interface.

12. The method of claim 1, further comprising:
generating a search message when the comparison result does not identify at least one of the generic user interface and adaptor; and
sending the search message to a repository to search for at least one of the generic user interface and adaptor module.

13. The method of claim 1, further comprising:
generating a new adaptor module when the comparison result does not identify the adaptor module; and
including the new adaptor module in the response message.

14. The method of claim 1, further comprising:
generating a new generic user interface when the comparison result does not identify the generic user interface; and
including instructions corresponding to the new generic user interface in the contract response message.

15. The method of claim 1, wherein the customized user interface displays the contract and the instruction included in the contract response message relates to a screen including fields representing corresponding clauses of the contract.

16. A system for generating a customized user interface representing a contract, comprising:
a memory device storing a template library, an adaptor library, and instructions;
a data processor executing the instructions to:
receive, over an electronic network, a contract description message including description information corresponding to a computer device being used to display the contract to a user; and
retrieve the description information from the contract description message;
a comparator comparing the description information with information stored in the template library and the adaptor library to identify a generic user interface and a corresponding adaptor module; and
a ranking engine ranking the identified generic user interface and the identified adaptor module, wherein:
the identified generic user interface is ranked when the comparison provides a plurality of potential generic user interfaces for generation of the customized user interface; and
the identified adaptor module is ranked when the comparison provides a plurality of potential adaptor modules for generation of the customized user interface,
wherein the data processor generates a contract response message based on a result of the comparison and the ranking, the response message including an instruction to generate, on the computer device, the customized user interface based on the identified generic user interface and corresponding adaptor module when the generic user interface and the corresponding adaptor module are identified.

17. The system of claim 16, wherein the identified generic user interface is ranked highest from the plurality of potential generic user interfaces.

18. The system of claim 16 wherein the identified adaptor module is ranked highest from the plurality of potential adaptor modules.

19. The system of claim 16, wherein the adaptor library includes adaptor metadata corresponding to the adaptor module, and comparing the description information with the information includes comparing the adaptor metadata with the description information to identify the adaptor.

20. A non-transitory computer-readable storage medium comprising instructions, which when executed on a processor, cause the processor to perform a method of generating a customized user interface representing a contract, the method comprising:
receiving a contract description message including description information corresponding to a computer device being used to display the contract;
retrieving the description information from the contract description message;
comparing the description information with information stored in a template library and adaptor library to identify a generic user interface and a corresponding adaptor module;
ranking the identified generic user interface and the identified adaptor module, wherein:
the identified generic user interface is ranked when the comparison provides a plurality of potential generic user interfaces for generation of the customized user interface; and
the identified adaptor module is ranked when the comparison provides a plurality of potential adaptor modules for generation of the customized user interface; and
generating a contract response message based on a result of the comparison and the ranking, the response message including an instruction to generate, on the computer device, the customized user interface based on the identified generic user interface and corresponding adaptor module when the generic user interface and the corresponding adaptor module are identified.

* * * * *